United States Patent
André

(10) Patent No.: US 9,453,135 B2
(45) Date of Patent: Sep. 27, 2016

(54) RADIATION CURABLE FLUIDS

(71) Applicant: AGFA GRAPHICS NV, Mortsel (BE)

(72) Inventor: Xavier André, Mortsel (BE)

(73) Assignee: AGFA GRAPHICS NV, Mortsel (BE)

(*) Notice: Subject to any disclaimer, the term of this patent is extended or adjusted under 35 U.S.C. 154(b) by 27 days.

(21) Appl. No.: 14/413,262

(22) PCT Filed: Jun. 17, 2013

(86) PCT No.: PCT/EP2013/062510
§ 371 (c)(1),
(2) Date: Jan. 7, 2015

(87) PCT Pub. No.: WO2014/009106
PCT Pub. Date: Jan. 16, 2014

(65) Prior Publication Data
US 2015/0175822 A1    Jun. 25, 2015

(30) Foreign Application Priority Data
Jul. 10, 2012  (EP) .................................. 12175710

(51) Int. Cl.
*B41J 2/21* (2006.01)
*C09D 11/107* (2014.01)
*C09D 11/101* (2014.01)
*C09D 11/326* (2014.01)
*C09D 11/322* (2014.01)

(52) U.S. Cl.
CPC ............ *C09D 11/107* (2013.01); *B41J 2/2107* (2013.01); *B41J 2/2114* (2013.01); *C09D 11/101* (2013.01); *C09D 11/322* (2013.01); *C09D 11/326* (2013.01)

(58) Field of Classification Search
CPC ..... C09D 11/30; C09D 11/32; C09D 11/322; C09D 11/38; C09D 11/40; C09D 11/101; B41J 2/2107; B41J 11/0015; B41J 11/002
USPC ..................................... 347/95–102
See application file for complete search history.

(56) References Cited

U.S. PATENT DOCUMENTS

| | | |
|---|---|---|
| 2007/0066700 A1 | 3/2007 | Herlihy et al. |
| 2008/0299489 A1 | 12/2008 | Byers |
| 2011/0183081 A1 | 7/2011 | Nakane et al. |
| 2011/0196058 A1 | 8/2011 | Breton et al. |
| 2012/0083545 A1 | 4/2012 | Kida et al. |

FOREIGN PATENT DOCUMENTS

| | | | | |
|---|---|---|---|---|
| BE | EP 1911814 A1 | * | 4/2008 | ........... C09D 11/101 |
| BE | WO 2008074548 A1 | * | 6/2008 | ............. B41J 2/175 |
| BE | WO 2011160954 A1 | * | 12/2011 | ........... C09D 11/101 |
| EP | 0 997 508 A1 | | 5/2000 | |
| EP | 2 053 102 A1 | | 4/2009 | |
| EP | 2 053 103 A1 | | 4/2009 | |
| EP | 2 108 683 A1 | | 10/2009 | |
| EP | 2 305 762 A1 | | 4/2011 | |
| EP | 2 399 965 A1 | | 12/2011 | |
| WO | 2011/069943 A1 | | 6/2011 | |

OTHER PUBLICATIONS

Official Communication issued in International Patent Application No. PCT/EP2013/062510, mailed on Sep. 5, 2013.

* cited by examiner

*Primary Examiner* — Manish S Shah
(74) *Attorney, Agent, or Firm* — Keating and Bennett, LLP

(57) ABSTRACT

A radiation curable fluid includes a vinylether (meth)acrylate monomer, a compound including a sulfonic acid group, and a polymeric dispersant including heterocyclic groups having hetero atoms consisting of one or two nitrogen atoms.

8 Claims, No Drawings

RADIATION CURABLE FLUIDS

CROSS-REFERENCE TO RELATED APPLICATIONS

This application is a 371 National Stage Application of PCT/EP2013/062510, filed Jun. 17, 2013. This application claims the benefit of European Application No. 12175710.8, filed Jul. 10, 2012, which is incorporated by reference herein in its entirety.

BACKGROUND OF THE INVENTION

1. Field of the Invention

The present invention relates to radiation curable fluids, particularly to radiation curable inkjet inks for industrial inkjet printing methods.

2. Description of the Related Art

In industrial ink jet systems, there is a constant demand for increased printing speeds in combination with high image quality. The new print heads, designed for increasing printing speed, only operate with very low viscous inkjet inks. Radiation curable inkjet inks are particularly preferred because high quality images can be printed on non-absorbing ink-receivers. Suitable monomers to obtain such very low viscous ink jet inks have been described, for example, in EP 997508 A (AGFA) that discloses radiation curable monomers containing vinylether and acrylate functions.

Printing systems, such as offset and flexography, are being increasingly replaced for packaging applications by industrial inkjet printing systems due to their flexibility in use, e.g. variable data printing, and due to their enhanced reliability, allowing their incorporation into production lines, e.g. for printing on packaging. The use of low viscous vinylether acrylate monomers has revealed some drawbacks for reliability, especially regarding yellowing and constant ink viscosity.

Yellowing is a well-known degradation process in the polymerization of monomers, which may be initiated or accelerated by numerous factors including ultraviolet light (UV), visible light, ozone and other extraneous pollutants, intrinsic manufacturing impurities, oxygen, and heat.

One approach to reduce this deterioration is to add stabilizers such as antioxidants and UV stabilisers during manufacturing of the radiation curable fluids. However, the addition of UV stabilizers tends to reduce the curing speed of a UV curable fluid. US 2008299489 A (HP) discloses an ultraviolet curable coating fluid including a polymerizable olefin monomer or monomer blend that undergoes self-photoinitiating polymerization when exposed to a predetermined ultraviolet wavelength range, and a predetermined amount of an ultraviolet absorbing image stabilizer that has minimal absorption in the predetermined ultraviolet wavelength range.

US 2011183081 A (SEIKO EPSON) discloses a photocurable ink composition including a polymerizable compound; an acylphosphine oxide-based photopolymerization initiator; and up to 2 wt % of a stabilizer selected from a specific hindered amine-based compound and a hydroxyphenyltriazine-based compound.

Another approach is disclosed by US 2011196058 A XEROX) which uses optical brighteners to mask yellowing thus improving the appearance of an image.

However, most approaches target the photoinitiating system, since often discoloration is due to decomposition of the photoinitiating system.

The photoyellowing can be reduced by using specific photoinitiators that do not exhibit photoyellowing. EP 2108683 A (XEROX) discloses a substantially colourless radiation overcoat composition including a gellant, a monomer and a substantially non-yellowing photoinitiator selected from the group consisting of benzophenones, benzoin ethers, benzil ketals, α-hydroxyalkylphenones, and acylphosphine photoinitiators.

WO 2011/069943 (AGFA) discloses a UV LED curable composition including an aliphatic tertiary amine or dialkyl aniline co-initiator and a carbazole photoinitiator, which can be advantageously used to prevent unstable yellowing behaviour in an image upon storage.

The use of smaller amounts of photoinitiator usually also reduces the photoyellowing. Thioxanthone photoinitiators are known to form several degradation products with a limited stability. As a result, the original yellowing shifts upon storage of inkjet prints, this unstable yellowing behaviour makes control of the image tone in the final image difficult. EP 2053102 A (AGFA) discloses a radiation curable composition including at least 25 wt % of a vinylether acrylate and at least 15 wt % of a polymerizable compound comprising at least three acrylate groups; and a photoinitiator comprising a tertiary amine group and 0 to 3 wt % of isopropylthioxanthone.

US 2007066700 A (SUN CHEMICAL) discloses that the piperazine sensitizers of the invention cause yellowing and may only be used successfully in varnishes if this is not of importance.

EP 2399965 A1 (AGFA) discloses a free radical radiation curable inkjet ink containing a photoinitiator and polymerizable compounds including at least 45 wt % of a mixture of monomers consisting of: a) 10 to 35 wt % of one or more cyclic monofunctional acrylates wherein the homopolymer thereof has a $T_g$ larger than 20° C.; b) 10 to 30 wt % of a N-vinyl lactam and/or a vinylether acrylate; c) 10 to 30 wt % of an ethoxylated and/or propoxylated polyacrylate having a molecular weight of at least 450; wherein all wt % are based on the total weight of the inkjet ink. An ink is disclosed containing C.I Pigment Blue 15:4, the dispersant Disperbyk™ 162 and VEEA.

EP 2053103 A1 (AGFA) discloses a A free radical curable liquid for inkjet printing of food packaging materials comprising no initiator or otherwise one or more initiators selected from the group consisting of non-polymeric di- or multifunctional initiators, oligomeric initiators, polymeric initiators and polymerizable initiators; wherein the polymerizable composition of said liquid consists essentially of: a) 25-100 wt % of one or more polymerizable compounds A having at least one acrylate group G1 and at least one second ethylenically unsaturated polymerizable functional group G2 different from the group G1; b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B >24 wt %, then the weight percentage of compounds C>1 wt %; and wherein all weight percentages of A, B and C are based upon the total weight of the polymerizable composition; with the proviso that at least one polymerizable compound B or C is present in the polymerizable composition if the free radical curable liquid contains no initiator; wherein the polymerizable compound A has a copolymerization ratio of with r 1 and r 2 representing the copolymerization parameters of methyl-G1 respectively methyl-G2 determined according to the method of Kelen-Tudos.

It is also possible to eliminate the photoinitiating system by using electron beam curing instead of UV curing. However, in the case of vinylether acrylate monomers a profound yellowing could be observed, especially when compounds having sulfonic acid groups were present. This can be especially well observed for cyan and white radiation curable inks, which after printing and curing result in a greenish cyan respectively a yellowish white colour. Also an increase in ink viscosity was generally seen.

Therefore, there is a need to improve radiation curable fluids and inkjet inks including vinylether acrylate monomers that exhibit no or only minor photoyellowing and constant ink viscosity, resulting in a reliable industrial ink jet system.

SUMMARY OF THE INVENTION

It has been surprisingly discovered that the use of a polymeric dispersant having heterocyclic groups having hetero atoms consisting of one or two nitrogen atoms improved the yellowing of a radiation curable fluid including a vinylether (meth)acrylate monomer and a compound having a sulfonic acid group.

In order to overcome the problems described above, preferred embodiments of the present invention provide a radiation curable fluid as defined by claim 1 below producing reliable radiation curable fluids for industrial inkjet systems improved for yellowing and constant viscosity.

Further advantages and preferred embodiments of the present invention will become apparent from the following description.

DETAILED DESCRIPTION OF THE PREFERRED EMBODIMENTS

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Radiation Curable Fluids

The radiation curable fluid according a preferred embodiment of the present invention includes a vinylether (meth) acrylate monomer; a compound having a sulfonic acid group; and a polymeric dispersant with heterocyclic groups having hetero atoms consisting of one or two nitrogen atoms.

There is no limitation on the application, wherein the radiation curable fluid is used, and it may be inkjet printing, flexographic printing, screen printing, gravure printing and the like. A preferred embodiment is a radiation curable inkjet ink including the radiation curable fluid according to the present invention.

The surface tension of the radiation curable inkjet ink is preferably from 20 to 30 mN/m, more preferably from 22 to 28 mN/m. It is preferably 20 mN/m or more from the viewpoint of printability by a second radiation curable inkjet ink, and it is preferably not more than 30 mN/m from the viewpoint of wettability.

For having a good ejecting ability, the viscosity of the inkjet ink at the jetting temperature is preferably smaller than 30 mPa·s, more preferably smaller than 15 mPa·s, and most preferably between 1 and 10 mPa·s at a shear rate of 100 s$^{-1}$ and a jetting temperature between 10 and 70° C.

The viscosity of the radiation curable inkjet ink is smaller than 30 mPa·s, preferably smaller than 28 mPa·s, and most preferably between 1 and 25 mPa·s at 25° C. and at a shear rate of 100 s$^{-1}$.

The radiation curable fluids and inkjet inks can be aqueous or non-aqueous, but are preferably non-aqueous. In an industrial inkjet printing environment, aqueous inkjet inks tend to suffer more from latency problems than non-aqueous inkjet inks.

In radiation curable inkjet inks organic solvent(s) are preferably fully replaced by one or more monomers and/or oligomers. However sometimes, it can be advantageous to add a small amount of an organic solvent to improve the dissolution of the dispersant or to improve adhesion to the ink-receiver. The content of organic solvent should be lower than 20 wt %, more preferably lower than 5 wt % based on the total weight of the (inkjet) ink and most preferably the curable pigment dispersion or ink doesn't include any organic solvent.

Suitable organic solvents include alcohols, aromatic hydrocarbons, ketones, esters, aliphatic hydrocarbons, higher fatty acids, carbitols, cellosolves, higher fatty acid esters. Suitable alcohols include methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N, N-dimethylformamid may be used.

Preferred examples of organic solvents are disclosed in [0133] to [0146] of EP 1857510 A (AGFA GRAPHICS).

If the radiation curable fluid is a curable inkjet ink, organic solvent(s) are preferably fully replaced by one or more monomers and/or oligomers to obtain the liquid dispersion medium. Sometimes, it can be advantageous to add a small amount of an organic solvent to improve the dissolution of the dispersant. The content of organic solvent should be lower than 20 wt %, more preferably lower than 5 wt % based on the total weight of the (inkjet) ink and most preferably the curable pigment dispersion or ink doesn't include any organic solvent.

In the most preferred embodiment, the radiation curable fluids and inkjet inks include 0 to 3 wt % of a solvent.

Sulfonated Compounds

There is no real limitation on the compound having a sulfonic acid group, it can be a surfactant, a polymerization inhibitor, a dye, a colour pigment and the like.

In a preferred embodiment of the radiation curable fluid, the compound with a sulfonic acid group is a colour pigment.

The compound having a sulfonic acid group is preferably present as an additive, i.e. in small concentrations, preferably less than 5 wt %, more preferably less than 2 wt % and most preferably less than 1 wt % all based on the total weight of the radiation curable fluid or inkjet ink.

Polymeric Dispersants

The radiation curable fluid or inkjet ink includes a polymeric dispersant with heterocyclic groups having hetero atoms consisting of one or two nitrogen atoms. The polymeric dispersant having heterocyclic groups having hetero atoms consisting of one or two nitrogen atoms is used for reducing yellowing in a radiation curable fluid including a vinylether (meth)acrylate monomer and a compound having a sulfonic acid group.

In a preferred embodiment, the heterocyclic groups having hetero atoms consisting of one or two nitrogen atoms include pyridine groups.

In a preferred embodiment, the polymeric dispersant is a copolymer of vinyl-2-pyridine or vinyl-4-pyridine, more preferably including an acrylate as co-monomer, and most preferably including a butyl acrylate monomer as acrylate co-monomer. The co-monomer may also be a styrene monomer.

In a very preferred embodiment, the radiation curable fluid has an amine value of the polymeric dispersant is at least 30 mg KOH/g. This means that a plurality of heterocyclic groups having hetero atoms consisting of one or two nitrogen atoms, such as pyridine groups, is present in the radiation curable fluid or inkjet ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

The polymeric dispersant is preferably used in an amount of 1 to 30 wt % based on the weight of the radiation curable fluid.

If a colour pigment, preferably a colour pigment with a sulfonated pigment surface, is present, then the polymeric dispersant is preferably used in an amount of 2 to 600 wt %, more preferably 5 to 200 wt %, most preferably 50 to 90 wt % based on the weight of the pigment.

Vinylether Acrylate Monomers

The radiation curable fluid and inkjet ink include a vinylether (meth)acrylate monomer.

The vinylether (meth)acrylate monomer is preferably a monomer represented by Formula (I):

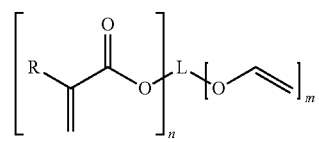

Formula (I)

wherein,
R represents hydrogen or a methyl group;
L represents a linking group comprising at least one carbon atom; and
n and m independently represent a value from 1 to 5.

The radiation curable fluid or inkjet ink preferably includes 2-(2-vinyloxyethoxy)ethyl acrylate as vinylether (meth)acrylate monomer.

In a preferred embodiment, the vinylether (meth)acrylate monomer is present in the radiation curable fluid and inkjet ink in an amount of 20 wt % to 90 wt %, more preferably 25 wt % to 80 wt % and most preferably 30 wt % to 70 wt %, all based upon the total weight of the radiation curable fluid and inkjet ink.

Other Polymerizable Compounds

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri-and higher functionality monomers, oligomers and/or prepolymers may be used. The viscosity of the radiation curable compositions and inks can be adjusted by varying the ratio between the monomers and oligomers.

The monomers and oligomers used in radiation curable fluids and inkjet inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA).

Colour Pigments

The radiation curable fluid can be a clear radiation curable fluid, but preferably it includes at least one colorant.

The colorant is preferably a dye or a pigment, most preferably a pigment.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Preferred pigments are disclosed in paragraphs [0128] to [0138] of WO 2008/074548 (AGFA).

In a preferred embodiment, the compound with a sulfonic acid group in the radiation curable fluid or inkjet ink is a colour pigment.

In a preferred embodiment, the radiation curable fluid includes a colour pigment C.I. Pigment Blue 15:4 as the compound with a sulfonic acid group.

In another preferred embodiment, the compound with a sulfonic acid group is the radiation curable fluid is a colour pigment with a sulfonated pigment surface selected from the group consisting of C.I. Pigment Violet 23 and C.I. Pigment Red 57:1.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the radiation curable fluids and inkjet inks include a black pigment and at least one pigment selected from the group consisting of a blue pigment, a cyan pigment, magenta pigment and a red pigment. It was found that such a black fluid or inkjet ink had an improved appearance because of the neutral black colour.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased fastness, but mainly also because very small pigment particles or individual pigment molecules thereof may still be extracted in food packaging applications.

However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

The determination of the average particle size (the numeric average particle diameter) is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Preferred titanium dioxide pigments are those disclosed in [0117] and in [0118] of WO 2008/074548 (AGFA).

The pigments are preferably present in the range of 0.01 to 15%, more preferably in the range of 0.05 to 10% by weight and most preferably in the range of 0.1 to 8% by weight, each based on the total weight of the radiation curable fluid or inkjet ink. The white pigment is preferably present in an amount of 3% to 40% by weight of the radiation curable fluid or inkjet ink, and more preferably 5% to 35%. An amount of less than 3% by weight cannot achieve sufficient covering power and usually exhibits very poor storage stability and ejection property.

The radiation curable inkjet ink may be part of an inkjet ink set. The inkjet ink set preferably comprises at least one yellow curable ink (Y), at least one cyan curable ink (C) and at least one magenta curable ink (M) and preferably also at least one black curable ink (K). The curable CMYK-ink set may also be extended with extra inks such as red, green, blue, and/or orange to further enlarge the colour gamut of the image. The CMYK-ink set may also be extended by the combination of the full density inkjet inks with light density inkjet inks. The combination of dark and light colour inks and/or black and grey inks improves the image quality by a lowered graininess.

Photoinitiators and Co-Initiators

The radiation curable fluids and inkjet inks preferably also contains an initiator. The initiator typically initiates the polymerization reaction. The initiator can be a thermal initiator, but is preferably a photoinitiator. A photoinitiator requires less energy to activate than the monomers, oligomers and/or prepolymers to form a polymer.

The photoinitiator in the radiation curable fluids and inkjet inks is preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p.287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4, 6trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For low migration radiation curable fluids and inkjet inks, the photoinitiator is preferably a so-called diffusion hindered photoinitiator. A diffusion hindered photoinitiator is a photoinitiator which exhibits a much lower mobility in a cured layer of the fluid or ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiators elected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the curable ink.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the radiation curable ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate).

The preferred co-initiators are aminobenzoates.

When one or more co-initiators are included into the radiation curable fluids and inkjet inks, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

The radiation curable fluids and inkjet inks preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA).

The radiation curable fluids and inkjet inks preferably includes the diffusion hindered co-initiator in an amount of 0.1 to 50 wt %, more preferably in an amount of 0.5 to 25 wt %, most preferably in an amount of 1 to 10 wt % of the total weight of the inkjet ink.

Polymerization Inhibitors

The radiation curable fluids and inkjet inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total (inkjet) ink.

Surfactants

The radiation curable fluids and inkjet inks may contain at least one surfactant. The surfactant can be anionic, cationic, non-ionic, or zwitter-ionic and are usually added in a total quantity less than 20 wt % based on the total weight of the ink and particularly in a total less than 10 wt % based on the total weight of the ink. Surfactants can, depending on their chemical and physical properties, sometimes be used in small quantities of less than 2 wt % based on the total weight of the inkjet ink. This is especially true for silicone type surfactants since they are very effective in reducing the surface tension of an inkjet ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants. The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable surfactant, such as a polymerizable silicone surfactant or a polymerizable fluorinated surfactant, more preferably a (meth)acrylated silicone surfactant or a (meth)acrylated fluorinated surfactant.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

The (meth)acrylated silicone surfactant preferably has a viscosity at 25° C. of no more than 3,000 mPa·s, more preferably of no more than 2,000 mPa·s and most preferably between 100 and 1,000 mPa·s all measured at 25° C. and at a shear rate of 100 $s^{-1}$. A too high viscosity of (meth) acrylated silicone surfactant will increase the viscosity of the radiation curable inkjet inks to a level that the printing speed has to be reduced.

Preparation of Inkjet Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical devices and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Methods

An inkjet printing method including the steps of:
a) feeding an inkjet print head with a radiation curable inkjet ink as described above;
b) jetting the radiation curable inkjet ink on a substrate.

In a preferred embodiment of the inkjet printing method, the substrate is an opaque white substrate, preferably an opaque white substrate selected from the group consisting of a polyolefin, a polyester and copolymers thereof. In a particularly preferred embodiment of the inkjet printing method the substrate is selected from the group consisting of polyethylene terephthalate, polyethylene, polypropylene and copolymers thereof Corona discharge and plasma treatments may be used and are well-known to a person skilled in the art of printing for improving wettability or surface tension energy of the substrate to make them more compatible with adhesives or printing inks. An atmospheric plasma treatment is preferred over a chemical plasma treatment and certainly over a flame plasma treatment since the latter requires higher temperatures wherein many substrates that are treated with a flame plasma get damaged.

The radiation curable inkjet ink may be jetted by one or more printing heads ejecting small droplets of ink in a controlled manner through nozzles onto the polymeric surface, which is moving relative to the printing head(s). A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

The inkjet print head normally scans back and forth in a transversal direction across the moving polymeric surface. However in a preferred embodiment, the inkjet printing method according to a preferred embodiment of the present invention is performed by a so-called single pass printing process. This can be accomplished by using page wide inkjet print heads or multiple staggered inkjet print heads which cover the entire width of the ink-receiving polymeric surface. In a single pass printing process the inkjet printing heads usually remain stationary and the ink-receiving polymeric surface is transported under the inkjet print heads.

The radiation curable inkjet ink may be cured by actinic radiation selected preferably from the group consisting of UV radiation, infrared radiation, electron beam and combinations thereof. The radiation curable inkjet ink is preferably cured by electron beam curing if no initiator is present in the radiation curable inkjet ink. The radiation curable inkjet ink is preferably cured by UV radiation if a photoinitiator or photoinitiating system is present in the radiation curable inkjet ink.

The curing device may be arranged in combination with the print head of the inkjet printer, travelling therewith so that the radiation curable inkjet ink is exposed to curing radiation very shortly after been jetted.

Any ultraviolet light source, as long as part of the emitted light can be absorbed by the photoinitiator or photoinitiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

In a particular preferred embodiment, the radiation curable inkjet ink on the polymeric surface is cured by UV radiation, more preferably by UV radiation emitted by one or more light emitting diodes (UV-LEDs) or lasers.

For facilitating curing, the inkjet printer may include one or more oxygen depletion units. The oxygen depletion units place a blanket of nitrogen or other relatively inert gas like $CO_2$, with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Thermal curing can be performed image-wise by use of a thermal head, a heat stylus, hot stamping, a laser beam, etc. If a laser beam is used, then preferably an infrared laser is used in combination with an infrared absorber in the curable ink.

When electron beams are employed, the exposure amount of the aforesaid electron beam is preferably controlled to be in the range of 0.1-20 Mrad. An exposure amount of not less than 0.1 Mrad does not result in sufficient curing of the curable inkjet inks. An exposure amount of more than 20 Mrad is not preferred because it is able to avoid deterioration of supports, especially paper and certain type of plastics. Preferred electron beam exposure systems are a scanning system, a curtain beam system, and a broad beam system. Appropriate acceleration voltage during electron beam exposure is 100-300 kV. The most important advantage of using an electron beam exposure system, compared to the ultraviolet radiation exposure, is that for printing on packaging materials curable inks lacking an initiator can be used. Hence, no toxicological problems can occur due to extraction of the initiator.

EXAMPLES

Materials

All materials used in the following examples were readily available from standard sources such as Aldrich Chemical Co. (Belgium) and Acros (Belgium) unless otherwise specified. The water used was deionized water.

VEEA is 2-(vinylethoxy)ethyl acrylate, having an APHA of 3, available from NIPPON SHOKUBAI, Japan.

PTSA is p-toluenesulfonic acid.

Cupferron™ AL is aluminum N-nitrosophenylhydroxylamine from WAKO CHEMICALS LTD.

INHIB is a mixture forming a polymerization inhibitor having a composition according to Table 1.

TABLE 1

| Component | wt % |
|---|---|
| VEEA | 82.4 |
| p-methoxyphenol | 4.0 |
| 2,6-di-tert-butyl-4-methylphenol | 10.0 |
| Cupferron ™ AL | 3.6 |

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolactam and toluene diisocyanate having an amine value of 13 mg KOH/g, a Mn of about 4,425 and a Mw of about 6,270.

SS35000 is a polyethyleneimine core grafted with polyester-hyperdispersant having an amine value of 28 mg KOH/g available as Solsperse™ 35000 from LUBRIZOL.

SS39000 is a polyethyleneimine core grafted with polyester-hyperdispersant having an amine value of 24 mg KOH/g available as Solsperse™ 39000 from LUBRIZOL.

E7701 is a butylacrylate-vinylpyridine copolymer having an amine value of 40 mg KOH/g available as Efka™ 7701 from BASF.

PB15:4 is Sun Fast Blue

M600 is dipentaerythritol hexaacrylate and an abbreviation for Miramer™ M600 available from RAHN AG.

ITX is Darocur™ ITX is an isomeric mixture of 2- and 4-isopropylthioxanthone from BASF.

IC819 is Irgacure™ 819 is a photoinitiator available from BASF having as chemical structure:

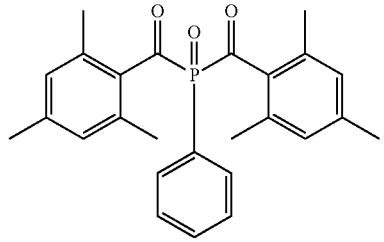

IC379 is Irgacure™ 379 is a photoinitiator available from BASF having as chemical structure:

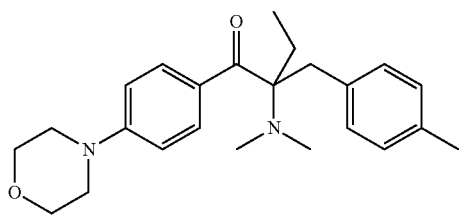 [SMILES: CCC(Cc1ccc(C)cc1)(C(=O)c1ccc(N2CCOCC2)cc1)N(C)C]

IC907 is 2-methyl-1-[4-(methylthio)phenyl]-2-morpholino-propan-1-one, a photoinitiator available as Irgacure™ 907 from BASF.

BYK™ UV3510 is a polyether modified polydimethylsiloxane wetting agent available from BYK CHEMIE GMBH.

Measurement Methods

1. APHA

The APHA value is a yellowness index of a given fluid which was determined in accordance with ASTM D 1209 on a LICO™ 200 colorimeter of Dr Lange, equipped for liquid samples and for measurements in the visible region.

2. Viscosity

The viscosity of the formulations was measured using a Brookfield DV-II+ viscometer at 45° C. at 12 rotations per minute (RPM) using a CPE 40 spindle.

For reliable industrial inkjet printing, the ink viscosity should after storage differ by no more than 10%, preferably by no more than 5%.

3. Particle Size

The particle size of pigment particles in inkjet ink was determined by photon correlation spectroscopy at a wavelength of 633 nm with a 4 mW HeNe laser on a diluted sample of the inkjet ink. The particle size analyzer used was a Malvern™ nano-S available from Goffin-Meyvis.

The sample was prepared by addition of one drop of ink to a cuvette containing 1.5 mL ethyl acetate and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is below 200 nm, preferably between 70 and 150 nm.

The inkjet ink is considered to be a stable pigment dispersion if the particle size did not increase by more than 15% after a heat treatment of 7 days at 80° C.

4. Amine Value

The amine value of the polymeric dispersant is determined according to DIN 16945.

Example 1

This Example illustrates the effect that polymeric dispersants have on the yellowing of radiation curable fluids including a vinylether acrylate monomer and a compound having a sulfonic acid group.

Preparation of Radiation Curable Fluids

A radiation curable fluid F-1 was prepared by mixing VEEA with 1 wt % of the stabilizer INHIB based on the total weight of the radiation curable fluid and adding 10 ppm of PTSA under stirring. The radiation curable fluids F-2 to F-7 were prepared by adding the polymeric dispersant in an amount according to Table 3.

TABLE 3

| Curable Fluid | Polymeric Dispersant | |
|---|---|---|
| | Type | Amount |
| F-1 | — | — |
| F-2 | DB162 | 50 ppm |
| F-3 | DB162 | 100 ppm |
| F-4 | SS35000 | 50 ppm |
| F-5 | SS35000 | 100 ppm |
| F-6 | E7701 | 50 ppm |
| F-7 | E7701 | 100 ppm |

Evaluation and Results

The radiation curable fluids F-1 to F-7 were kept in a closed transparent container for 2 weeks at 25° C.

The APHA was measured just after preparation (Fresh), after 1 week and after 2 weeks. The results are shown in Table 4.

TABLE 4

| Curable | APHA | | |
|---|---|---|---|
| Fluid | Fresh | After 1 week | After 2 weeks |
| F-1 | 3 | 16 | solid |
| F-2 | 4 | 64 | 226 |
| F-3 | 4 | 32 | 35 |
| F-4 | 4 | 138 | 548 |
| F-5 | 4 | 56 | 119 |
| F-6 | 4 | 18 | 14 |
| F-7 | 4 | 16 | 14 |

From Table 4, it can be seen that only the radiation curable fluids F-6 and F-7 including a polymeric dispersant according to a preferred embodiment of the present invention exhibited no yellowing after 1 week and also that the non-yellowing effect was stable. The radiation curable fluids F-3 and F-5 including different types of amine dispersants showed a minor improvement on yellowing which however deteriorated after two weeks. An increase in viscosity was observed for the curable fluids F-1 to F-5. After two weeks the curable fluid F-1 had even solidified.

Example 2

This Example illustrates the effect of the dispersant type on the viscosity and the dispersion stability of electron beam curable inkjet inks.

Preparation of Electron Beam Curable Inkjet Inks

The electron beam curable inkjet inks Ink-1 to Ink-4 were all prepared in the same manner.

First a concentrated cyan pigment dispersion was prepared by mixing for 20 minutes the 60 g of pigment Sun Fast Blue, 150 g of 40% solution of the polymeric dispersant (see Table 6) in VEEA and 1 g of the stabilizer INHIB in the monomer VEEA using a DISPERLUX™ disperser (from DISPERLUX S.A.R.L., Luxembourg). The mixture was then milled with Netzch MiniZeta wherein the internal volume was filled for 50% with 0.4 mm yttrium stabilized zirconia beads ("high wear resistant zirconia grinding media" from TOSOH Co.). The mixture was dispersed for 2 hours at a rotation speed of 3,000 rpm. During the complete milling procedure the content in the mill was cooled to a temperature of 42° C. After milling, the concentrated pigment dispersion was discharged and had a composition according to Table 5.

TABLE 5

| Component | wt % |
|---|---|
| PB15:4 | 15 |
| Dispersant | 15 |
| INHIB | 1 |
| VEEA | 69 |

The concentrated cyan pigment dispersions were then diluted by VEEA and M600 to obtain an ink composition as shown in Table 6.

TABLE 6

| wt % of | Ink-1 | Ink-2 | Ink-3 | Ink-4 |
|---|---|---|---|---|
| PB15:4 | 3.0 | 3.0 | 3.0 | 3.0 |
| SS35000 | 3.0 | — | — | — |
| SS39000 | — | 3.0 | — | — |
| DB162 | — | — | 3.0 | — |
| E7701 | — | — | — | 3.0 |
| INHIB | 0.2 | 0.2 | 0.2 | 0.2 |
| VEEA | 87.8 | 87.8 | 87.8 | 87.8 |
| M600 | 6.0 | 6.0 | 6.0 | 6.0 |

Evaluation and Results

The viscosity and the particle size of the electron beam curable inkjet inks Ink-1 to Ink-4 was determined just after their preparation and again after a heat treatment of 7 days at 80° C. The results are shown in Table 7.

TABLE 7

| | After preparation | | After heat treatment | |
|---|---|---|---|---|
| Inkjet Ink | Viscosity (mPa · s) | Particle Size (nm) | % Increase in Viscosity | % Increase of Particle Size |
| Ink-1 | 5.5 | 96 | 28% | 11% |
| Ink-2 | 4.7 | 100 | 131% | 26% |
| Ink-3 | 4.0 | 87 | 66% | 2% |
| Ink-4 | 5.3 | 119 | 5% | 0% |

From Table 7, that only inkjet ink Ink-4 having a dispersant according to a preferred embodiment of the present invention exhibited stable ink viscosity and dispersion stability.

Example 3

This Example illustrates the effect of the dispersant on the ink viscosity during storage of a UV curable inkjet ink.

Preparation of UV Curable Inkjet Inks

The UV curable inkjet inks Ink-5 and Ink-6 were prepared in the same manner.

Two concentrated cyan pigment dispersions were prepared by mixing PB15:4, a 30% solution of the dispersant in VEEA and the stabilizer INHIB for 30 minutes in VEEA in order to obtain a composition according to Table 8 using a DISPERLUX™ Dissolver (from DISPERLUX S.A.R.L., Luxembourg) and subsequently milling this mixture in a DYNOMILL ECM POLY mill (from BACHOFEN GmbH) having a bead filling of 42% with 0.4 mm yttrium stabilized zirconium oxide beads ("high wear resistant zirconia grinding media" from TOSOH Co.) for 120 minutes at a rotation speed of 10.4 m/s. After milling the dispersion was separated from the beads using a filter cloth.

TABLE 8

| Component | wt % |
|---|---|
| PB15:4 | 15 |
| Dispersant | 15 |
| INHIB | 1 |
| VEEA | 69 |

These concentrated cyan pigment dispersions were then diluted and mixed for 70 minutes to obtain the UV curable inkjet inks Ink-5 and Ink-6 according to Table 9.

TABLE 9

| wt % of component | Ink-5 | Ink-5 |
|---|---|---|
| PB15:4 | 3.0 | 3.0 |
| DB162 | 3.0 | — |
| E7701 | — | 3.0 |
| VEEA | 74.2 | 74.2 |
| M600 | 6.0 | 6.0 |
| INHIB | 0.8 | 0.8 |
| ITX | 2.0 | 2.0 |
| IC819 | 3.0 | 3.0 |
| IC907 | 5.0 | 5.0 |
| IC379 | 2.0 | 2.0 |
| BYK™ UV 3510 | 1.0 | 1.0 |

Evaluation and Results

The viscosity was then measured after preparation and after storage under several conditions. Directly after preparation the viscosity of the inkjet inks Ink-5 and Ink-6 was 5.3 mPa·s, respectively 5.6 mPa·s.

Several 5 liter black jerry cans were filled with the inkjet inks Ink-5 and Ink-6 leaving a head space of about 5% and then sealed and closed with a cap. The jerry cans were stored in a dark place under different storage conditions and after storage the ink viscosity was determined by taking an ink sample from the top of the vertically stored jerry cans. The results are shown in Table 10.

TABLE 10

| | % Increase in Viscosity | |
|---|---|---|
| Storage Condition | Ink-5 | Ink-6 |
| 6 weeks at 25° C. | 3% | 0% |
| 6 months at 25° C. | 104% | 0% |
| 9 months at 25° C. | solid | 2% |
| 18 months at 25° C. | solid | 6% |
| 1 month at 45° C. | 0% | 0% |
| 1 month at 60° C. | 12% | 0% |

Table 10 shows that only the UV curable inkjet ink Ink-6 in accordance with the invention has a constant ink viscosity after storage suitable for reliable industrial inkjet printing.

The invention claimed is:

1. A radiation curable fluid comprising:
    a vinylether (meth)acrylate monomer;
    a compound including a sulfonic acid group; and
    a polymeric dispersant including heterocyclic groups including hetero atoms consisting of one or two nitrogen atoms; wherein
    an amine value of the polymeric dispersant is at least 30 mg KOH/g;
    the heterocyclic groups including the hetero atoms consisting of the one or two nitrogen atoms include pyridine groups;
    the polymeric dispersant is a copolymer of vinyl-2-pyridine or vinyl-4-pyridine; and
    the polymeric dispersant includes an acrylate co-monomer.

2. The radiation curable fluid according to claim 1, wherein the compound including the sulfonic acid group includes a colour pigment.

3. The radiation curable fluid according to claim 2, wherein the colour pigment is C.I. Pigment Blue 15:4.

4. The radiation curable fluid according to claim 2, wherein the colour pigment is a colour pigment including a sulfonated pigment surface selected from the group consisting of C.I. Pigment Violet 23 and C.I. Pigment Red 57:1.

5. The radiation curable fluid according to claim 1, further comprising 0 wt % to 3 wt % of organic solvent.

6. A radiation curable inkjet ink including the radiation curable fluid according to claim 1.

7. An inkjet printing method including the steps of: feeding an inkjet print head with a radiation curable inkjet ink including:
    a vinylether (meth)acrylate monomer;
    a compound including a sulfonic acid group; and
    a polymeric dispersant including heterocyclic groups including hetero atoms consisting of one or two nitrogen atoms; wherein
    an amine value of the polymeric dispersant is at least 30 mg KOH/g;
    the heterocyclic groups including the hetero atoms consisting of the one or two nitrogen atoms include pyridine groups;
    the polymeric dispersant is a copolymer of vinyl-2-pyridine or vinyl-4-pyridine; and the polymeric dispersant includes an acrylate co-monomer; and jetting the radiation curable inkjet ink onto a substrate.

8. The inkjet printing method according to claim 7, wherein the substrate is an opaque white substrate.

* * * * *